(12) United States Patent
Wakayama et al.

(10) Patent No.: US 8,956,542 B1
(45) Date of Patent: Feb. 17, 2015

(54) METHOD FOR PROCESSING RADIOACTIVELY-CONTAMINATED WATER

(71) Applicant: Showa Freezing Plant Co., Ltd., Hokkaido (JP)

(72) Inventors: Toshitsugi Wakayama, Hokkaido (JP); Seiko Wakayama, Hokkaido (JP)

(73) Assignee: Showa Freezing Plant Co., Ltd., Hokkaido (JP)

( * ) Notice: Subject to any disclaimer, the term of this patent is extended or adjusted under 35 U.S.C. 154(b) by 8 days.

(21) Appl. No.: 14/061,062

(22) Filed: Oct. 23, 2013

(30) Foreign Application Priority Data

Jul. 30, 2013 (JP) .................. 2013-157310

(51) Int. Cl.
*B01D 9/04* (2006.01)
*C02F 1/22* (2006.01)

(52) U.S. Cl.
USPC .............. 210/774; 210/198.1; 62/123; 62/67; 62/317; 376/312; 588/261

(58) Field of Classification Search
None
See application file for complete search history.

(56) References Cited

U.S. PATENT DOCUMENTS

| | | | | |
|---|---|---|---|---|
| 2,147,222 A | * | 2/1939 | Treub | 554/209 |
| 2,835,598 A | * | 5/1958 | Kolner | 62/540 |
| 2,851,368 A | * | 9/1958 | Findlay | 62/541 |
| 3,049,889 A | * | 8/1962 | Carfagno | 62/537 |
| 3,070,969 A | * | 1/1963 | Ashley et al. | 62/537 |
| 3,073,131 A | * | 1/1963 | Ashley | 62/542 |
| RE25,940 E | * | 12/1965 | Davids | 62/123 |
| 3,250,081 A | * | 5/1966 | Othmer | 62/535 |
| 3,277,667 A | * | 10/1966 | Hedrick | 62/343 |
| 3,292,386 A | * | 12/1966 | Johnson et al. | 62/123 |
| 3,314,881 A | * | 4/1967 | Tuwiner | 62/534 |
| 3,342,039 A | * | 9/1967 | Bridge et al. | 62/123 |
| 3,410,923 A | * | 11/1968 | Strand et al. | 585/816 |
| 3,442,801 A | * | 5/1969 | Anderson | 62/534 |
| 3,477,241 A | * | 11/1969 | Ashley | 62/124 |
| 3,501,924 A | * | 3/1970 | Ashley | 62/123 |
| 3,599,701 A | * | 8/1971 | Mollerstedt et al. | 159/47.1 |
| 3,620,034 A | * | 11/1971 | Ganiaris | 62/541 |
| 3,628,344 A | * | 12/1971 | King | 62/541 |
| 3,664,145 A | * | 5/1972 | Johnson | 62/537 |
| 3,712,075 A | * | 1/1973 | Smith et al. | 62/123 |
| 3,817,051 A | * | 6/1974 | Seliber | 62/123 |
| 3,859,069 A | * | 1/1975 | Seliber | 62/537 |

(Continued)

FOREIGN PATENT DOCUMENTS

JP 2002-153859 A 5/2002
JP 2009-291673 A 12/2009

(Continued)

*Primary Examiner* — Robert James Popovics
(74) *Attorney, Agent, or Firm* — Kolisch Hartwell, P.C.

(57) ABSTRACT

The present invention provides an efficient and low cost method for processing radioactively-contaminated water. The method for processing radioactively-contaminated water comprising a freeze concentration step of generating ice having lowered concentration of radioactive substance from radioactive substance containing contaminated water and concentrating the radioactive substances in the residual contaminated water by the interface progressive freeze concentration process. Preferably, the method further comprises a nitrogen substitution step of reducing dissolved oxygen in the contaminated water and adding nitrogen gas to the contaminated water, as a previous step of the freeze concentration step. Preferably, the radioactive substance is radioactive cesium.

4 Claims, 4 Drawing Sheets

(56) References Cited

U.S. PATENT DOCUMENTS

| | | | | |
|---|---|---|---|---|
| 3,864,932 | A | * | 2/1975 | Hsiao ............................... 62/123 |
| 3,885,399 | A | * | 5/1975 | Campbell ......................... 62/123 |
| 3,892,662 | A | * | 7/1975 | Stout ............................... 210/787 |
| 3,897,409 | A | * | 7/1975 | Huper et al. .................... 530/344 |
| 3,916,018 | A | * | 10/1975 | Edison et al. .................. 585/816 |
| 3,992,900 | A | * | 11/1976 | Campbell ......................... 62/541 |
| 4,040,973 | A | * | 8/1977 | Szivos et al. .................... 588/20 |
| 4,046,534 | A | * | 9/1977 | Maguire, Sr. ..................... 62/534 |
| 4,091,635 | A | * | 5/1978 | Ogman ............................. 62/123 |
| 4,112,702 | A | * | 9/1978 | Smirnov et al. ................. 62/123 |
| 4,143,524 | A | * | 3/1979 | Thijssen ........................... 62/542 |
| 4,286,436 | A | * | 9/1981 | Engdahl et al. .................. 62/123 |
| 4,314,455 | A | * | 2/1982 | Engdahl ........................... 62/124 |
| 4,338,109 | A | * | 7/1982 | Tijssen et al. ................... 62/541 |
| 4,372,766 | A | * | 2/1983 | Andrepont ....................... 62/532 |
| 4,392,959 | A | * | 7/1983 | Coillet ............................ 210/638 |
| 4,405,349 | A | * | 9/1983 | Mukherjee ....................... 62/532 |
| 4,406,679 | A | * | 9/1983 | Wrobel et al. .................... 62/541 |
| 4,430,104 | A | * | 2/1984 | Van Pelt et al. .................. 62/123 |
| 4,453,960 | A | * | 6/1984 | Andrepont ....................... 62/542 |
| 4,457,769 | A | * | 7/1984 | Engdahl ........................... 62/532 |
| 4,459,144 | A | * | 7/1984 | Van Pelt et al. .................. 62/541 |
| 4,493,719 | A | * | 1/1985 | Wintermantel et al. .......... 62/532 |
| 4,508,553 | A | * | 4/1985 | Thijssen et al. .................. 62/541 |
| 4,557,741 | A | * | 12/1985 | Van Pelt ........................... 62/541 |
| 4,572,785 | A | * | 2/1986 | Braaten ............................ 210/181 |
| 4,588,414 | A | * | 5/1986 | Takegami et al. ............... 23/295 R |
| RE32,241 | E | * | 9/1986 | Saxer ................................ 62/542 |
| 4,666,456 | A | * | 5/1987 | Thijssen et al. .................. 23/296 |
| 4,666,484 | A | * | 5/1987 | Shah et al. ....................... 62/532 |
| 4,705,624 | A | * | 11/1987 | Thijssen ........................... 210/96.1 |
| 4,713,102 | A | * | 12/1987 | Khudenko et al. ............... 62/535 |
| 4,795,571 | A | * | 1/1989 | Holzknecht et al. ............. 210/774 |
| 4,799,945 | A | * | 1/1989 | Chang .............................. 62/532 |
| 4,810,274 | A | * | 3/1989 | Cheng et al. ..................... 62/637 |
| 4,830,645 | A | * | 5/1989 | Ghodsizadeh et al. ........... 62/541 |
| 4,936,114 | A | * | 6/1990 | Engdahl et al. .................. 62/532 |
| 4,952,339 | A | * | 8/1990 | Temus et al. ..................... 588/20 |
| 5,028,240 | A | * | 7/1991 | Moore et al. ..................... 44/453 |
| 5,037,463 | A | * | 8/1991 | Engdahl et al. .................. 62/532 |
| 5,055,237 | A | * | 10/1991 | Husseiny .......................... 588/20 |
| 5,060,483 | A | * | 10/1991 | Heiland et al. ................... 62/123 |
| 5,127,921 | A | * | 7/1992 | Griffiths .......................... 23/295 R |
| 5,181,396 | A | * | 1/1993 | Saari ................................ 62/541 |
| 5,394,706 | A | * | 3/1995 | Keus ................................. 62/123 |
| 5,400,619 | A | * | 3/1995 | Husseiny et al. ................. 62/532 |
| 5,443,733 | A | * | 8/1995 | Mueller et al. ................... 210/651 |
| 5,466,266 | A | * | 11/1995 | Griffiths .......................... 23/295 R |
| 5,470,473 | A | * | 11/1995 | Park et al. ........................ 210/402 |
| 5,546,763 | A | * | 8/1996 | Kikuchi et al. .................. 62/532 |
| 5,589,079 | A | * | 12/1996 | Park et al. ........................ 210/784 |
| 5,700,435 | A | * | 12/1997 | Bischof ............................ 422/245.1 |
| 5,935,534 | A | * | 8/1999 | Umino et al. .................... 422/245.1 |
| 6,076,364 | A | | 6/2000 | Stripp .............................. 62/123 |
| 6,247,321 | B1 | * | 6/2001 | Roodenrijs ....................... 62/123 |
| 6,305,178 | B1 | * | 10/2001 | Shi et al. .......................... 62/123 |
| 6,305,189 | B1 | * | 10/2001 | Menin .............................. 62/544 |
| 6,367,285 | B1 | * | 4/2002 | Shinozaki et al. ............... 62/535 |
| 6,500,347 | B2 | * | 12/2002 | Ohkoshi et al. ................. 210/772 |
| 7,127,913 | B2 | * | 10/2006 | Witkamp et al. ................. 62/532 |
| 7,815,732 | B2 | * | 10/2010 | Le Bail ............................ 117/11 |
| 8,034,312 | B2 | * | 10/2011 | Scholz et al. ..................... 423/321.1 |
| 8,245,521 | B2 | * | 8/2012 | Sarkar et al. ..................... 62/115 |
| 2005/0056599 | A1 | * | 3/2005 | Wilsak et al. .................... 210/767 |
| 2005/0279129 | A1 | * | 12/2005 | Muchnik .......................... 62/532 |
| 2010/0037653 | A1 | * | 2/2010 | Enis et al. ........................ 62/532 |
| 2011/0079044 | A1 | * | 4/2011 | Teduka et al. .................... 62/544 |

FOREIGN PATENT DOCUMENTS

| | | |
|---|---|---|
| JP | 2013-040852 A | 2/2013 |
| WO | 2013094711 A1 | 6/2013 |

\* cited by examiner

METHOD FOR PROCESSING RADIOACTIVELY-CONTAMINATED WATER

CROSS-REFERENCE TO RELATED APPLICATION

This application claims priority to Japanese Patent Application No. 2013-157310, filed on Jul. 30, 2013, which is hereby incorporated by reference.

BACKGROUND OF THE INVENTION

The present invention relates to a processing method for decontaminating radioactive substances from radioactively-contaminated water.

DESCRIPTION OF THE RELATED ART

A large amount of contaminated water containing radioactive cesium caused by the accident of the nuclear power plant is generating, therefore, developing an efficient process for decontaminating cesium from the contaminated water is an urgent task. The tolerant level of the radioactive cesium for human body is very low, so it is necessary to infallibly decontaminate the radioactive cesium from the contaminated water at a level of ppb (parts per billion) or ppm (parts per million). The radioactive cesium (hereinafter occasionally called simply "cesium") in the contaminated water is existing in a form of a cesium ion in the solution. There are methods for decontaminating the cesium ion dissolved in the solution, such as precipitation method, ion exchange method, adsorption method and evaporation method, and in particular, the ion exchange method and the adsorption method are frequently utilized because they are highly-efficient (refer to Japanese Patent Laid-Open Publication No. 2013-40852 and International Publication No. 2013/094711).

On the other hand, freeze concentration method is conventionally known as one of the methods for waste water purification treatment for reuse of industrial water or agricultural water (refer to Japanese Patent Laid-Open Publication No. 2002-153859). The freeze concentration method is a method which uses the difference of congeal point of water and solute of a solution to deposit crystal ice in order to heighten the concentration of the residual solution by separating the ice. The freeze concentration method is for example, also utilized for generating purified water ice from seawater, and for concentrating fruit juice. Among various kinds of the freeze concentration methods, interface progressive freeze concentration method is known as a method which can separate solutes efficiently with a simple processing system. The interface progressive freeze concentration method is a method which grows crystal ice in layered form on a freezing surface by flowing down a test processing liquid on the chilled freezing surface and circulating the test processing liquid (refer to Japanese Patent Laid-Open Publication No. 2009-291673).

BRIEF SUMMARY OF THE INVENTION

As a method for decontaminating cesium ion from the solution, the ion exchange method and the adsorption method have problems that these methods require processing facilities with complicated configuration and special adsorbents, so the cost for the facilities and adsorbents for processing large amount of contaminated water will be high.

In case of applying the freeze concentration method as a method for decontaminating the cesium ion from the contaminated water, wherein the various substances are mingled, circulation of the contaminated water may results a same function as that of agitation, so it can not deny the possibility of causing a contingent chemical reaction. Therefore, in case of applying the freeze concentration method, it is considered that before the application, the contaminated water has to be chemically stabilized as is possible.

In light of the above circumstances, the object of the present invention is to provide a processing method for decontaminating the radioactive substances from the radioactive substance containing contaminated water which can be conducted safely with simple configuration and with no special treatment materials.

In order to solve the problem, the present invention includes following configurations.

According to an aspect of the present invention, a method comprising a freeze concentration step of generating ice having lowered concentration of radioactive substance by freezing the water of the radioactive substance containing contaminated water and concentrating the radioactive substances in the residual contaminated water with the interface progressive freeze concentration process.

According to the said aspect, the method preferably further comprises a nitrogen substitution step of reducing dissolved oxygen in the contaminated water and adding nitrogen gas to the contaminated water, as a previous step of the freeze concentration step.

According to the said aspect, the radioactive substance is radioactive cesium.

According to the present invention, by applying the interface progressive freeze concentration process to the radioactive substance containing contaminated water, the water of the contaminated water is frozen and the ice which has at least lowered concentration of the radioactive substance is generated. Preferably, according to the present invention, the ice of which the radioactive substances are decontaminated can be generated. By removing the ice generated like this way, the amount of the former radioactive substance contaminated water can be greatly reduced. This enables to reduce the storage space for the contaminated water.

In case where the amount of the radioactive substances of the ice frozen by the processing method of the present invention is below the prescribed safety standards, then the ice can be utilized as it is. Also, by repeating the processing method of the present invention to the water which was generated by melting the ice, the concentration of the radioactive substance can be further lowered.

According to the processing method of the present invention, a chiller is only required as a minimal facility for generating ice, so it is advantageous that any processing facilities with complicated configuration and any special processing materials are not necessary. Therefore, the present invention is extremely useful as a method for processing large amount of contaminated water.

Furthermore, as a previous step, the nitrogen substitution conducted by reducing the dissolved oxygen in the contaminated water and adding the nitrogen gas to the contaminated water, allows the contaminated water to become chemically stable by the inactive nitrogen gas, and even circulating the contaminated water in the freeze concentration process, the contingent chemical reaction caused by the agitation can be prevented.

DETAILED DESCRIPTION

Embodiments of the present invention will be described below. The present invention provides a processing method for purifying the contaminated water containing the radioactive substances. The target radioactive substances of the present invention are mainly water soluble substances existing in the contaminated water in the form of ion, but it is also effective for water insoluble substances. The water soluble radioactive substance is typically cesium 137, for example.

Figure 1:
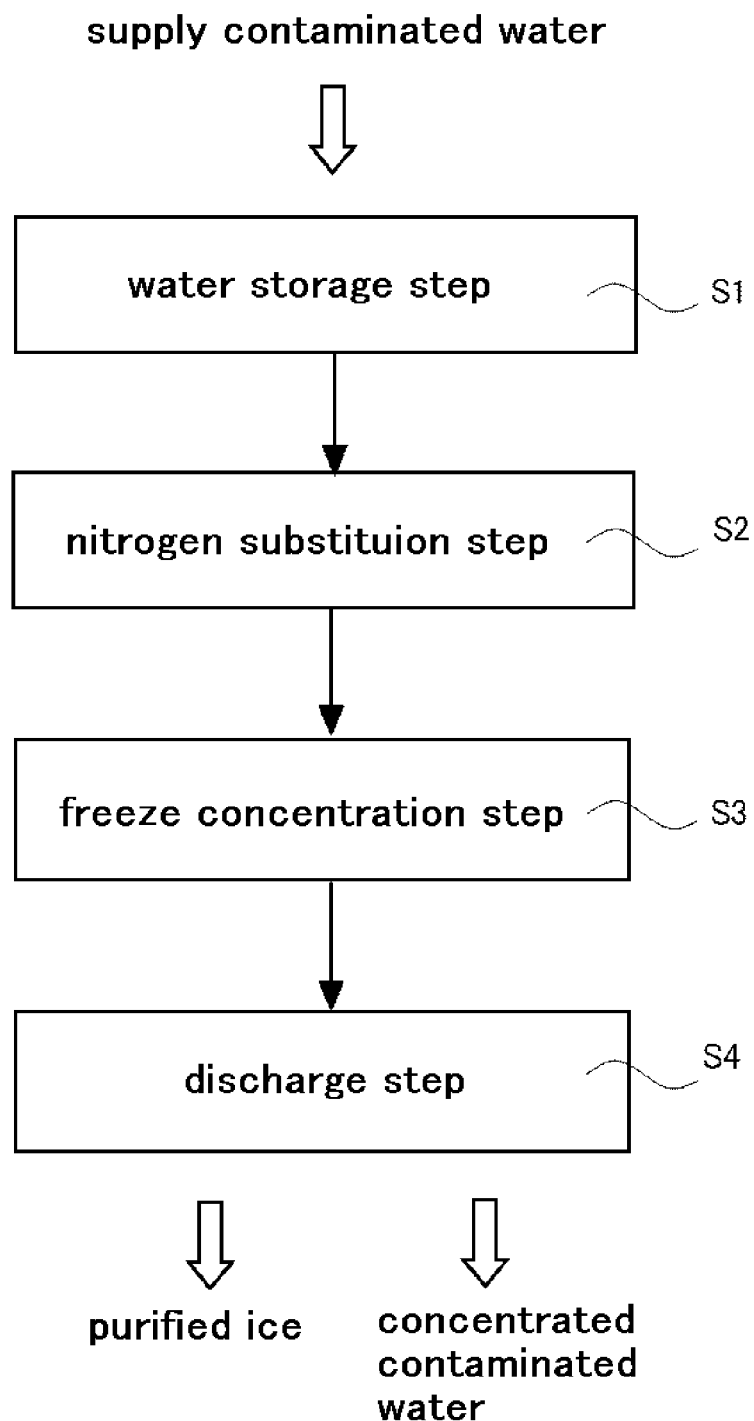
FIG. 1 is a flow chart schematically showing a basic flow of the method for processing the contaminated water of the present invention.

FIG. 1 is a flow chart showing a schematic flow of a preferred example of the method for processing the contaminated water of the present invention.

At first, in step 1, a water storage step is conducted by providing and storing the retrieved contaminated water in an appropriate tank. Next, in step 2, a nitrogen substitution step is conducted by reducing the dissolved oxygen and dissolving nitrogen gas to the contaminated water which is stored. The nitrogen substitution step is a preferred step, but not essential. Then, in step 3, a freeze concentration step is conducted by applying the interface progressive freeze concentration process which generates layered ice on a freezing surface by providing the nitrogen substituted contaminated water cyclically like flowing down on the freezing surface chilled at freezing temperature of water. When water freezes and generates ice, there is a function that water soluble substances and water insoluble substances are removed from solid phase to liquid phase. As a result of this, the ice with lowered concentration of the radioactive substance is obtained and the radioactive substances are concentrated in the residual solution. At last, in step 4, a discharge step is conducted by removing the generated ice and the concentrated residual contaminated water.

The freeze concentration step of step 3 and the discharge step of step 4 may be conducted repeatedly. More specifically, the ice which was removed in step 4 is melted and the freeze concentration step of step 3 is conducted again. As a result of this, the ice with more lowered concentration of the radioactive substance is obtained.

Figure 2:
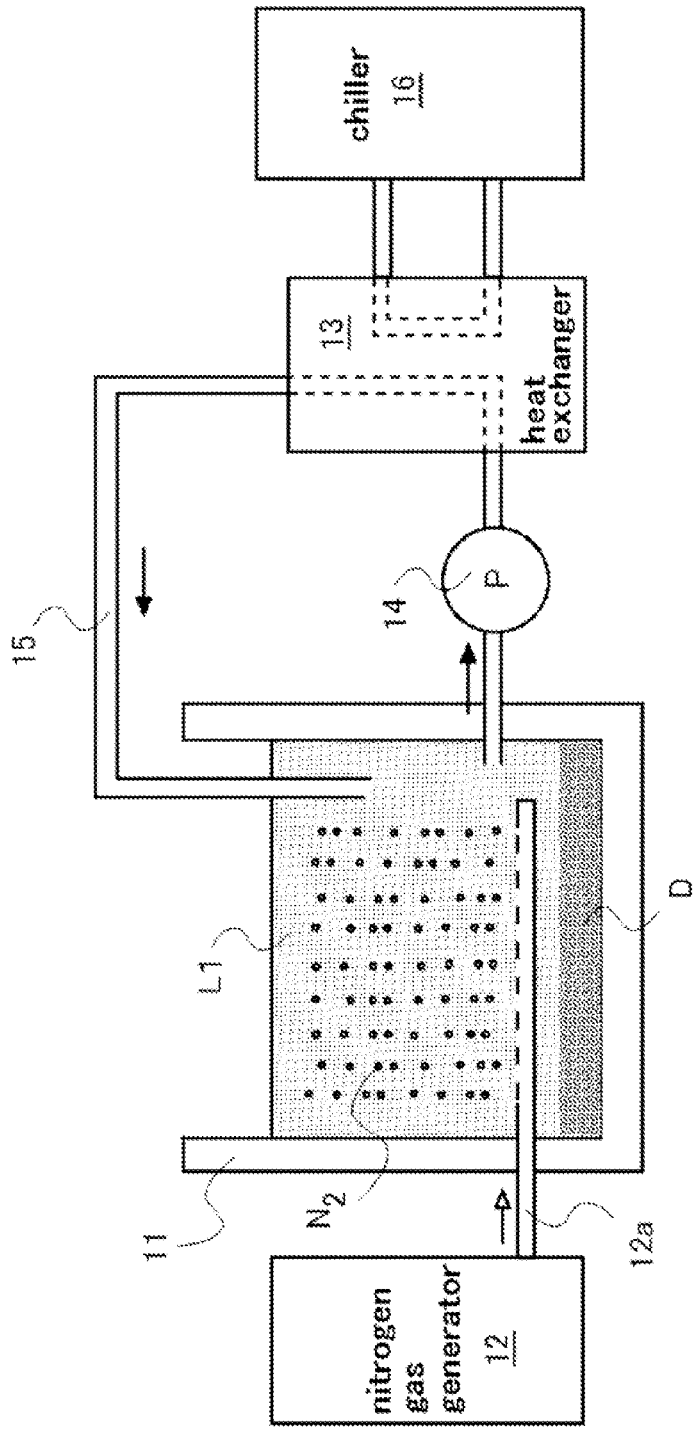
FIG. 2 is a block diagram showing an example of a processing apparatus used for conducting the nitrogen substitution step of the method for processing indicated in FIG. 1.

FIG. 2 is a block diagram showing an example of a processing apparatus used for conducting the nitrogen substitution step of the method for processing indicated in FIG. 1.

Water storage tank 11 is filled with the contaminated water which is raw water. Nitrogen gas generator 12 injects nitrogen gas into the raw contaminated water through nitrogen gas supplying tube 12a. Nitrogen gas generator 12, for example, is comprised of an air compressor which compresses the air and a nitrogen gas extractor which extracts the nitrogen gas from the compressed air. The nitrogen gas extractor is provided with, for example, a nitrogen demarcation membrane made of polyimide hollow fiber membrane. By aerating the nitrogen gas to the contaminated water, the dissolved oxygen in the contaminated water is reduced and the dissolved nitrogen is increased. That is to say, the oxygen is substituted with the nitrogen. Generally, when the water temperature is at 0° C., dissolved oxygen DO is 14.6 mg per liter, but according to the present invention, the dissolved oxygen may be reduced to, for example, approximately 1.0 mg per liter. It can be deemed that the amount of the reduction of the oxygen is almost entirely substituted with the nitrogen.

More specifically, the relation between water temperature and dissolved oxygen is as follows.

| Water temperature (° C.) | Dissolved oxygen (mg/L) |
| --- | --- |
| 0 | 14.6 |
| 10 | 10.9 |
| 20 | 8.8 |

<First Test>

The nitrogen substitution test was conducted using an apparatus which is as like as that indicated in FIG. 2 but is smaller scale for test.

Method of the Test

First, water storage tank 11 was filled with 300 liters of raw water (as this is a test, tap water was used). Then, nitrogen gas was injected into the raw water with 0.2 MPa supplied pressure of nitrogen gas generator 12 for three and a half hours.

Result of the Test

As indicated in the result of the test, dissolved oxygen in water is greatly reduced by injecting nitrogen gas into water.

Furthermore, during the nitrogen substitution step, it is preferred that the contaminated water is cooled down to the temperature around 0° C. By cooling, the amount of the nitrogen gas dissolved into the contaminated water will increase. As a cooling apparatus, chiller 16 and heat exchanger 13 are used. The contaminated water is circulated between water storage tank 11 and heat exchanger 13 by pump 14 and circulating pipe 15.

In water storage tank 11, it is preferred that water insoluble substances floating in the contaminated water are precipitated. The precipitation D accumulated on the bottom of water storage tank 11 is processed separately after nitrogen substituted contaminated water L1 is discharged.

<Second Test>

Another nitrogen substitution test was conducted using the apparatus indicated in FIG. 2.

Method of the Test

First, water storage tank 11 was filled with 20,000 liters of raw water (sea water of 3% salinity was used for this test). Then, nitrogen gas was injected into the raw water with 0.2 MPa supplied pressure of nitrogen gas generator 12 for eight hours. The raw water was cooled by the chiller 16. After that, the raw water was left still for sixteen and a half hours at 3.0° C.

Result of the Test

| Time | Water temperature (° C.) | Dissolved oxygen (mg/L) |
| --- | --- | --- |
| start time | 8.4 | 4.99 |
| after 1 hour | 9.1 | 3.13 |
| after 2 hours | 9.6 | 3.02 |
| after 3 and ½ hours | 9.2 | 1.36 |

| Time | Water temperature (° C.) | Dissolved oxygen (mg/L) |
| --- | --- | --- |
| start time | 20.6 | 5.21 |
| after 1 hour | 18.1 | 3.15 |
| after 2 hours | 15.6 | 1.85 |

-continued

| Time | Water temperature (° C.) | Dissolved oxygen (mg/L) |
|---|---|---|
| after 3 hours | 12.9 | 1.29 |
| after 4 hour | 10.6 | 1.09 |
| after 5 hours | 8.5 | 0.91 |
| after 6 hours | 6.5 | 0.84 |
| after 7 hours | 4.9 | 0.76 |
| after 8 hours | 3.2 | 0.70 |
| after 16 and ½ hours | 3.0 | 0.70 |

As indicated in the result of the test, dissolved oxygen in water is greatly reduced by injecting nitrogen gas into sea water.

The apparatus indicated in FIG. 2 may also be used as a processing apparatus for conducting the freeze concentration step of the method for processing indicated in FIG. 1. After the nitrogen substitution step, the nitrogen substituted contaminated water in water storage tank 11 is cooled to around 0° C. to generate sherbet-like ice in the water. As the sherbet-like ice is generated, it will rise to the surface of the water and be accumulated thereon. When the sherbet-like ice is generated, the water soluble substances and the water insoluble substances in the contaminated water are removed to liquid phase. As a result, the concentration of the water soluble substances and the water insoluble substances of the contaminated water which did not freeze will be heightened. Then, the discharge step of the method for processing indicated in FIG. 1 is conducted by removing the sherbet-like ice from the surface of the water. Consequently, the amount of the contaminated water in the tank 11 is reduced by the amount of the ice removed.

Figure 3:
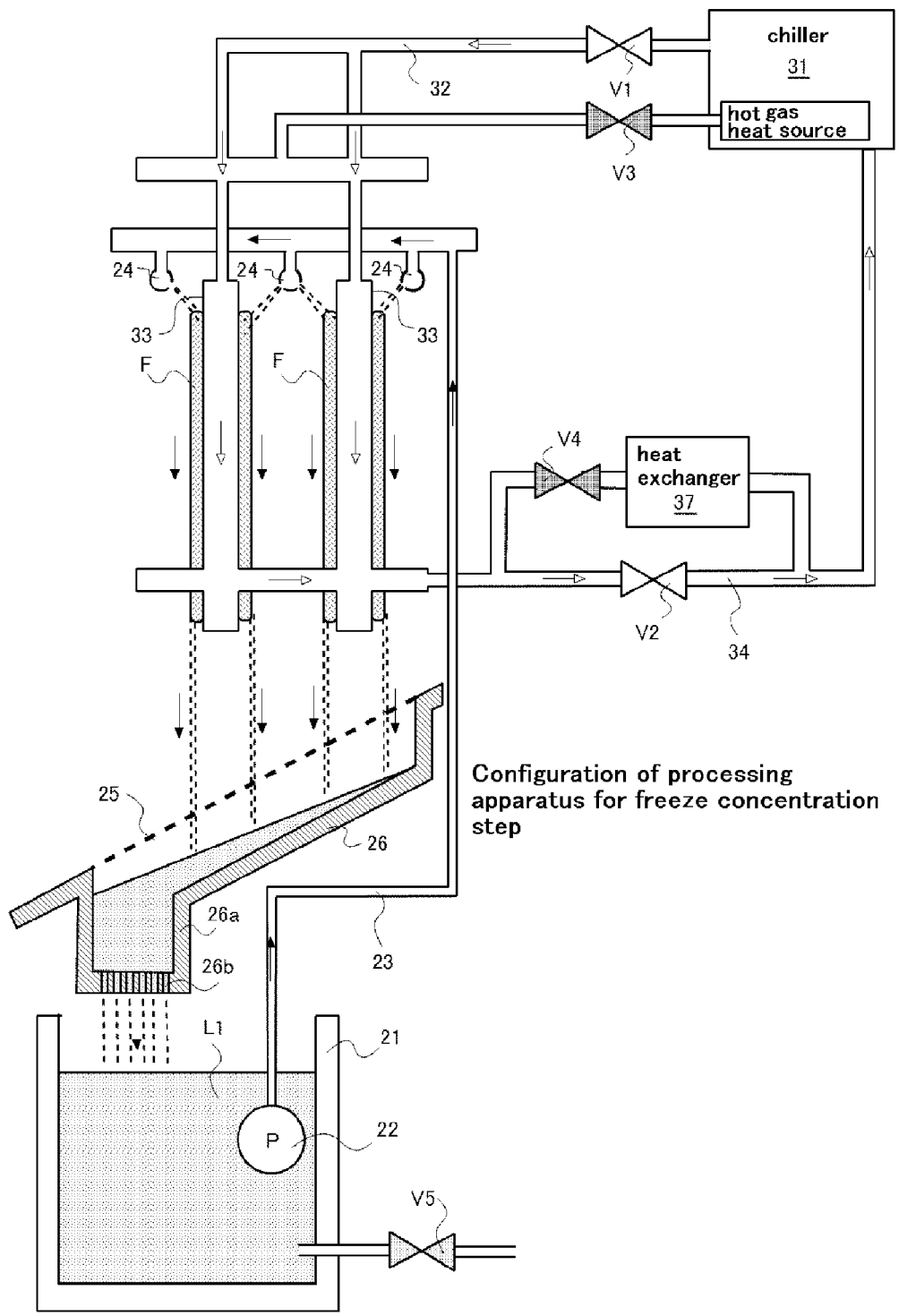
FIG. 3 is a block diagram showing an example of a processing apparatus used for conducting the freeze concentration step of the method for processing indicated in FIG. 1.

FIG. 3 is a block diagram showing a further example of a processing apparatus used for conducting the freeze concentration step of the method for processing indicated in FIG. 1. With respect to valve V1 to V5 in FIG. 3, the valves in white are indicating opened state and the valves in gray are indicating closed state. Preferably, in the freeze concentration step, the interface progressive freeze concentration processing method is applied.

For the interface progressive freeze concentration processing method, various techniques for decontaminating solutes as much as possible and generating ice from the purified water, are known. For instance, a method which contrives such as configuration and arrangement of the freezing surface, heat transmission of the freezing surface, and flow rate and flow speed of the solution, or a technique which irradiates ultrasonic waves to the interface of solid phase and liquid phase of the freezing part. The methods of which these known techniques for the interface progressive freeze concentration processing method applied to the freeze concentration step of the present invention is also included in the scope of the present invention.

Water storage tank 21 is provided and filled with nitrogen substituted contaminated water L1 in water storage tank 11 indicated in FIG. 2. Water storage tank 21 may be also used as water storage tank 11 indicated in FIG. 2. Nitrogen substituted contaminated water L1 is delivered to sprinkling tube 24 through circulating pipe 23 by pump 22 (refer to black arrow). Below sprinkling tube 24, freezing board 33 is situated having a freezing surface situated in a vertical direction. The examples shown in the figures are provided with two freezing boards 33. Inside of freezing board 33, a flow channel of cooling medium is formed. In the freeze concentration step, the cooling medium delivered from chiller 31 is provided to freezing board 33 through valve V1 and cooling medium supplying tube 32, and is brought back to chiller 31 by falling down inside of freezing board 33, and through valve V2 and cooling medium returning tube 34.

Nitrogen substituted contaminated water L1 is sprinkled from sprinkling tube 24 to near top edge of freezing board 33, and flows down along the freezing surface. In the course of flowing down, layered ice F is generated on the freezing surface. When ice F is generated, the water soluble substances and the water insoluble substances in the contaminated water are removed to liquid phase. As a result, the concentration of the water soluble substances and the water insoluble substances of the contaminated water which did not freeze will be heightened. The contaminated water which did not freeze falls down from the bottom edge of freezing board 33 (refer to black arrow). Below freezing board 33, water vessel 26 is situated. The fallen contaminated water passes through throating board 25 which is attached to the surface of water vessel 26, and the fallen contaminated water is accumulated in pool part 26a of water vessel 26. Pore 26b is formed on the bottom face of pool part 26a. The contaminated water passes through pore 26b and falls into water storage tank 21.

As the circulation of the contaminated water is repeated, ice F is getting thicker, and the whole amount of the contaminated water L1 will be reduced and the contaminated substances will be concentrated.

Figure 4:
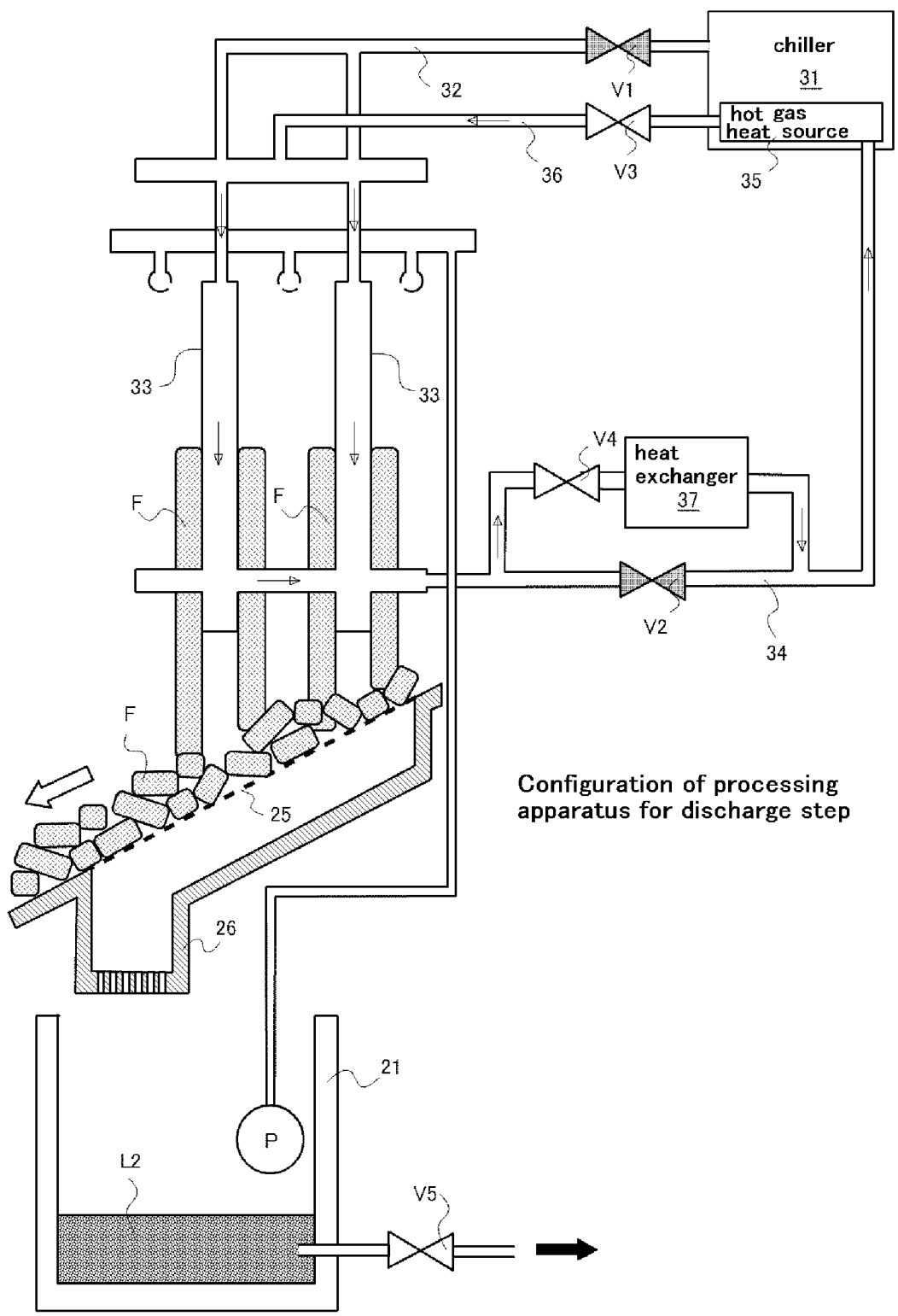
FIG. 4 is a block diagram showing an example of a processing apparatus used for conducting the discharge step of the method for processing indicated in FIG. 1.

FIG. 4 is a block diagram showing an example of a processing apparatus used for conducting the discharge step of the method for processing indicated in FIG. 1. The processing apparatus it self is same as that of indicated in FIG. 3. With respect to valve V1 to V5 in FIG. 4, the valves in white are indicating opened state and the valves in gray are indicating closed state.

After halting the circulation of the contaminated water, to remove ice F generated on freezing board 33, first of all, valve V1 is closed and the supply of cooling medium from chiller 31 is stopped. In chiller 31, high temperature hot gas is generated when the cooling medium is compressed. In the examples shown in the figures, the hot gas is utilized as a heat source for removing ice F. From hot gas heat source 35, the hot gas passes through valve V3 and hot gas supplying tube 36, and the hot gas is delivered to the inside of freezing board 33. This makes the portion of ice F which contacts with the freezing surface, melts and falls downward. Fallen ice F is crashed adequately on inclined throating board 25 and is discharged to outside. The heat source for detaching ice F from freezing board 33 is not limited to the hot gas, but such as a heater may be used.

The temperature of the hot gas is lowered during it falls inside of freezing board 33, but by passing through valve V4 and heat exchanger 37, the hot gas is heated again and is delivered to hot gas heat source 35 (refer to arrow).

On the one hand, ice F is discharged, but on the other hand, the residual contaminated water in water storage tank 21 became concentrated contaminated water L2 with high concentration of contaminated substance. The amount of concentrated contaminated water L2 is reduced for the amount of water which was turned into the ice, compared to nitrogen substituted contaminated water L1 in FIG. 3. Concentrated contaminated water L2 is discharged from valve V5, and stored or processed separately.

What is claimed is:
1. A method of removing radioactive substances from radioactively-contaminated water comprising the steps of:
reducing the level of dissolved oxygen in said radioactively-contaminated water by adding inactive nitrogen gas to the radioactively-contaminated water, resulting in more chemically stable, radioactively-contaminated water; and freeze concentrating said more chemically stable, radioactively-contaminated water by flowing it past a freezing surface chilled at the freezing temperature of water and generating layered ice on said freezing surface, said layered ice having a lower concentration of said radioactive substance, with a residual solution having a higher concentration of said radioactive substance.

2. A method of removing radioactive substances from radioactively-contaminated water as set forth in claim 1, further comprising the steps of:

repeatedly melting any resulting layered ice and subjecting the resulting melt to a freeze concentration step, to further purify the water.

3. A method of removing radioactive substances from radioactively-contaminated water as set forth in claim 1, wherein the radioactive substance is radioactive cesium.

4. A method of removing radioactive substances from radioactively-contaminated water as set forth in claim 2, wherein the radioactive substance is radioactive cesium.

* * * * *